2,855,339

THIOCYANATO COMPOSITIONS

Hein L. Klopping, Wilmington, Del., assignor to E. I. du Pont de Nemours and Company, Wilmington, Del., a corporation of Delaware No Drawing. Application April 27, 1955
Serial No. 504,341

5 Claims. (Cl. 167—22)

This invention relates to bis(thiocyanomethyl) compounds containing a central sulfur, sulfoxide group, or sulfone group, their preparation and the use of the sulfoxide and sulfone compounds in fungicidal compositions and methods.

The compounds of my invention are members of the class represented by the formula:

(1) 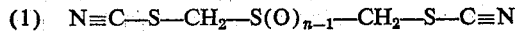

in which $n$ is a whole number from 1 thru 3. Thus the compounds of my invention are bis(thiocyanomethyl) sulfide, with $n$ being 1 in the above formula; bis(thiocyanomethyl)sulfoxide, with $n$ being 2; and bis(thiocyanomethyl)sulfone, with $n$ being 3.

In the preparation of my compounds a bis(halomethyl) sulfide is reacted in an aqueous medium with an inorganic thiocyanate to form bis(thiocyanomethyl)sulfide. By way of example, the following equation illustrates this reaction with specific reactants:

(2)

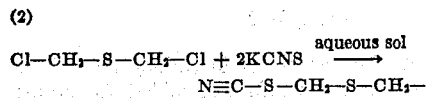

The sulfoxide or sulfone is then prepared by oxidation of the bis(thiocyanomethyl)sulfide using conventional oxidants, in accordance with the following equations:

(3)

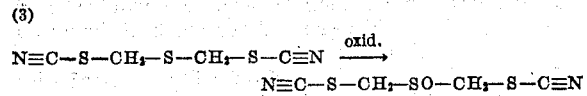

(4)

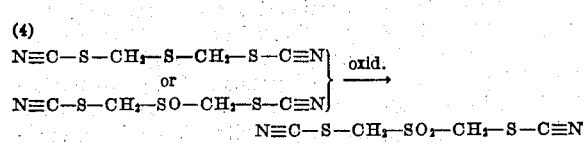

In the preparation of bis(thiocyanomethyl)sulfide, bis (chloromethyl)sulfide is the preferred starting material, although other bis(halomethyl)sulfides, such as bis (bromomethyl)sulfide can be used. The bis(halomethyl) sulfide can be introduced into the aqueous inorganic thiocyanate solution either as such or in the form of a solution in a suitable inert solvent, such as dioxane or benzene.

The inorganic thiocyanate can be any of the common inorganic thiocyanates. For example, it can be an alkali or alkaline earth thiocyanate, such as sodium thiocyanate, potassium thiocyanate, ammonium thiocyanate or calcium thiocyanate.

The desired amount of the thiocyanate is mixed with water to form a solution, which can be saturated or diluted. Preferably, a saturated aqueous thiocyanate solution containing a substantial excess of the thiocyanate is used. For example, a saturated aqueous solution of potassium thiocyanate containing a 50% excess of the thiocyanate can be used.

During addition of the bis(halomethyl)sulfide to the aqueous thiocyanate solution, the temperature of the reaction mixture is kept above its freezing point and below the melting point of the bis(thiocyanomethyl)sulfide product, namely 60° C. Preferably, the reaction is carried out between 5 and 45° C., with the maximum yield being obtained when the temperature is kept around 5° C. during the addition, and allowed to go up to 40 to 45° C. during the rest of the reaction period. As the reactants are intermixed, precipitation of the product takes place.

The precipitate containing bis (thiocyanomethyl) sulfide, can be separated from the reaction mixture by simple filtration. The major impurities remaining in the filtered product are inorganic salts, which can be removed, if desired, by thorough washing with water or by extracting the product from the impurities with a suitable organic solvent such as benzene. However, the bis(thiocyanomethyl)sulfide is sufficiently pure for use without further purification in the preparation of my sulfoxide and sulfone compounds.

Bis(thiocyanomethyl)sulfoxide is prepared from bis-(thiocyanomethyl)sulfide by oxidation. Any of the well-known oxidizing agents can be employed. Hydrogen peroxide or organic peracids such as performic or peracetic acid are preferred. The oxidation can be carried out in a suitable solvent such as acetone or acetic acid.

Preferably a temperature between 20 and 40° C. is maintained during the oxidation. A 10 to 20% excess of oxidizing agent can be employed to give increased yields. Although some of the sulfoxide precipitates in the reaction mixture, most of the product remains in solution. It can be isolated by vacuum-concentrating the solution.

Bis(thiocyanomethyl)sulfone is prepared by oxidation of either bis(thiocyanomethyl)sulfide or bis(thiocyanomethyl)sulfoxide, the latter starting material giving the better yields. The oxidation can be carried out in a suitable solvent such as acetone or acetic acid. Any of the well-known oxidizing agents can be employed, with hydrogen peroxide and organic peracids such as performic or peracetic acid being preferred.

The reaction preferably is carried out at temperatures ranging from 20 to 40° C. A 10 to 20% excess of the oxidizing agent can be used to give increased yields. Some of the sulfone product precipitates from the reaction mixture. The rest can be isolated by vacuum-concentrating the reaction mixture.

I have found that bis(thiocyanomethyl) sulfoxide and bis(thiocyanomethyl)sulfone are extremely effective fungicides. They can be formulated into the conventional types of fungicidal compositions that are highly effective as anti-fungal agents such as foliar fungicidal sprays, soil fungicides, seed disinfestants and seed protectants. These compounds are also effective as insecticides. Likewise they are effective in control of certain types of bacteria. Additionally they have some utility as nematocides.

In practicing the fungicidal methods of my invention, bis(thiocyanomethyl)sulfoxide and/or bis(thiocyanomethyl)sulfone of the invention is applied to the material to be treated for the control of fungi at a dosage sufficient to exert fungicidal action. Accordingly, my compounds can be used, for example, for the protection of carbohydrates, proteins and fats. More specifically, they can be used, for example, to treat living plants such as vegetables, ornamental plants, and fruit-bearing trees. Also they can be used to treat organic fibers or fabrics and various cellulosic materials such as leather and wood. Likewise, they can be used to treat paints and lubricating oils. However, their greatest utility appears to be in treating plant seeds and in treating soil into which seeds have been or are going to be planted, that is in uses as seed disinfestants, seed protectants, and soil fungicides.

The dosage employed in the fungicidal methods of the invention is largely determined by and dependent upon the particular fungicidal compound selected, and, in the case of application to vegetation and seeds, the susceptibility of the particular vegetation to the compound selected, the state and condition of growth of the vegetation to be treated, and the climatic conditions.

In application as soil fungicide, in most instances a dosage or rate in general from about 5 to 100 lbs./acre is employed, the optimum amount within this range being largely dependent upon the variables mentioned heretofore. In application to seed, usually a dosage of from about 1/16 to 4 oz. of active ingredient per 100 pounds of seed is used.

In general, the fungicidal compositions of my invention contain insufficient amount to exert fungicidal action bis(thiocyanomethyl)sulfoxide and/or bis(thiocyanomethyl)sulfone as an active ingredient in admixture with a carrier material or conditioning agent of the kind used and commonly referred to in the art as a fungicide adjuvant or modifier. Usually from about 1% to 95% by weight of the fungicidal composition is active ingredient.

The conventional fungicide adjuvants are inert solids, organic liquid diluents and surface-active agents. They provide formulations adapted for ready and efficient application using conventional applicator equipment. Thus, one or both of my fungicidally-active compounds is admixed with a fungicide adjuvant material to provide a formulation in liquid or solid form.

Solid compositions are preferably in the form of powders. They are compounded to be homogeneous powders that either can be used as such, diluted with inert solids to form dusts or suspended in a suitable liquid medium for spray application. The powders can comprise principally the active ingredient and minor amounts of conditioning agent. They can also be prepared by admixing the active compound with large amounts of finely divided inert solids. Natural clays either absorptive such as attapulgite or relatively non-absorptive such as China clays, diatomaceous earth, walnut shell flour, redwood flour, synthetic fine silica, calcium silicate, and other inert solid carriers of the kind conventionally employed in wettable powder fungicidal compositions can be used. The active ingredient usually makes up from about 25 to 90% of these wettable powder compositions. Suitable diluents for conversion to dusts are talc, pyrophyllite, tobacco dust, volcanic ash and other dense rapid settling inert solids.

Liquid compositions employing one or both of the fungicidal compounds of my invention are prepared by admixing the active ingredient with a suitable liquid diluent media. The active ingredient can be either in solution or in suspension in the liquid media. Typical of the liquid media commonly employed as fungicide adjuvants are water, kerosene, Stoddard solvent, xylene, alcohols, alkylated naphthalene, and glycols. The active ingredient usually makes up from about 0.5 to 50% of these liquid compositions. Some of these compositions are designed to be used as such, others to be extended with large quantities of water.

Compositions in the form of wettable powders or liquids in many cases also include a surface-active agent of the kind sometimes referred to in the art as a wetting, dispersing or emulsifying agent. These materials cause the compositions to disperse or emulsify easily in water so as to give aqueous sprays.

The surface-active agents employed can be of the anionic, cationic or monionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in articles by McCutcheon in "Soap and Sanitary Chemicals," August, September and October of 1949.

In order that the invention may be better understood, the following examples are given:

*Example 1*

Trithioformaldehyde was prepared from formaldehyde hydrochloric acid and hydrogen sulfide in the manner described in Organic Syntheses Coll., vol. II, page 610. This trithioformaldehyde was reacted with sulfur dichloride in the manner described by F. G. Mann and W. J. Pope (J. Chem. Soc., 123, 1172 (1923)) to give a virtually quantitative yield of bis(chloromethyl)sulfide.

A solution was then prepared containing 172 grams (50% excess) of potassium thiocyanate and 100 ml. of water. This solution was stirred and cooled to 5° C. Over a period of 40 minutes, 80 grams of bis(chloromethyl)sulfide were added dropwise to the potassium thiocyanate solution. Stirring and cooling were continued during and after the addition of the bis(chloromethyl)sulfide. The cooling bath was removed ½ hour after completion of the addition of the sulfide, and stirring was continued for an additional 3½ hours while the reaction mixture was allowed to warm up to 40 to 45° C. A substantial quantity of a tan crystalline solid had precipitated out of the reaction mixture.

This solid was collected on a filter, washed with water, and air-dried. It weighed 138 grams, and contained bis(thiocyanomethyl)sulfide and inorganic salts. Although this product was sufficiently pure to be used in the preparation of bis(thiocyanomethyl)sulfoxide and bis(thiocyanomethyl)sulfone, was purified by extracting it exhaustively with boiling benzene and evaporating the combined extracts to dryness. The resultant purified crystalline compound was off-white in color and consisted essentially of bis(thiocyanomethyl)sulfide. It had a melting point of 58–60° C.

*Analysis.*—Calculated for $C_4H_4N_2S_3$: C 27.25, H 2.28, N 15.90, S 54.57. Found: C 27.32, H 2.38, N 15.99, S 55.40.

*Example 2*

To a solution of 9.86 grams of bis(thiocyanomethyl)sulfide in 140 ml. of acetic acid was added 7.6 grams (20% excess) of 30% hydrogen peroxide. All of the hydrogen peroxide was added at one time to the acetic acid solution which was at room temperature. There was no noticeable evolution of heat. Precipitation of a white crystalline solid began. After about 48 hours no further precipitation occurred.

The precipitate was collected on a filter, washed with methanol and dried. It weighed 7 grams and melted at 118.5 to 121° C. Evaporation of the filtrate to a small volume gave another 2.1 grams of crystalline product, thus giving a total yield of 9.1 grams or 85%. Recrystallization of the product from acetic acid yielded substantially pure bis(thiocyanomethyl)sulfoxide having a melting point of 122 to 124° C.

*Analysis.*—Calculated for $C_4N_4N_2OS_3$: C 24.98, H 2.09, N 14.57, S 50.03. Found: C 24.91, H 2.13, N 14.63, S 49.68.

This compound was applied at a rate of 100 lbs./acre to soil that was naturally infested with Pythium, Rhizoctonia, Phytophthora and Fusarium species of fungus. Cotton seeds were then planted in the soil.

It was found that in four replicates, between 80 to 100% of the cotton seeds planted germinated and grew into healthy plants. In contrast, only about 6.7% of a control batch of cotton seed planted in identical soil that had not been treated with the bis(thiocyanomethyl)sulfoxide germinated and grew into healthy plants.

Test results similar to these were also obtained using the active ingredients in amounts as low as 33 lbs. acre or less.

To determine the effectiveness of bis(thiocyanomethyl)sulfoxide in protecting seeds from fungus and bacteria attack, this compound, formulated into a dust with fuller's earth, was applied in dosages of from 1/16 to 1/2 oz. per 100 pounds dosages of corn seed, and in dosages of from 1/16 to 4 oz. per 100 pounds of sorghum seed. The seeds were then planted, and after allowing sufficient time for the seeds to germinate and the plants to emerge from the soil, stand counts were made.

It was found that the percent of corn seed that emerged as healthy plants ranged from 5 to 7 times that of untreated seed. Likewise, the percent of sorghum seed that emerged as healthy plants ranged from 3 to 5 times that of untreated seed.

Bactericidal tests were also carried out to determine the effect of bis(thiocyanomethyl)sulfoxide as a bactericide. It was found that this compound is extremely effective at very low concentration in controlling the growth of *Salmonella typhimurium, Streptococcus agalactiae, Micrococcus pyogenes* (var. *aureus*), *Pseudomonas aeruginosa, Candida albicans* and *Escherichia coli.*

Example 3

To a solution of 22.2 grams of bis(thiocyanomethyl) sulfoxide in 350 ml. of acetone was added 22 grams of 40% peracetic acid dropwise, while stirring, at room temperature. The addition took 1/2 hour during which time the temperature rose from 23° C. to 26° C. Stirring was continued, and after 4 hours crystallization set in. The reaction mixture was stirred overnight.

The crystalline precipitate was then collected on a filter, washed with methanol and dried. It weighted 16.6 grams and had a melting point of 173 to 175° C. Evaporation of the filtrate gave a second crop weighing 5.7 grams. The total yield therefore was 22.3 grams, or 93%. Recrystallization of this product from acetic gave essentially pure bis(thiocyanomethyl)sulfone having a melting point of 183 to 185° C.

*Analysis.*—Calculated for $C_4H_4N_2O_2S_3$: C 23.96, H 1.94, N 13.45, S 46.18. Found: C 23.17, H 1.95, N 13.57, S 45.61.

This compound was applied at a rate of 100 lbs./acre to soil that was naturally infested with Pythium, Rhizoctonia, Phytophthora and Fusarium species of fungus. Cotton seeds were then planted in the soil.

It was found in four replicates that 95 to 100% of the cotton seeds planted germinated and grew into healthy plants. In contrast, only about 6.7% of a control batch of cotton seed planted in identical soil that had not been treated with the bis(thiocyanomethyl)sulfone germinated and grew into healthy plants.

To determine the effectiveness of bis(thiocyanomethyl) sulfone in protecting seeds from fungus and bacteria attack this compound was applied in dosages of from 1/16 to 1/2 oz. per 100 lbs. to batches of corn, and in dosages of from 1/16 to 4 oz. per 100 lbs. to batches of sorghum seed. The seeds were then planted and, after allowing sufficient time for the seeds to germinate and the plants to emerge from the soil, stand counts were made. The percent respectively of corn and sorghum seed that emerged as healthy plants was 5 to 7 times and 3 to 5 times that of untreated seed.

Bactericidal tests were also carried out to determine the effect of bis(thiocyanomethyl)sulfone as a bactericide against the following organisms: *Salmonella typhimurium, Streptococcus agalactiae, Micrococcus pyogenes* (var. *aureus*), *Pseudomonas aeruginosa, Candida albicans* and *Escherichia coli*. It was found that this compound was extremely effective in controlling the growth of these organisms at very low concentrations.

Example 4

A suitable wettable powder of the following composition is prepared by mixing the ingredients and passing the mixture through a micropulverizer:

| Ingredigent: | Parts by weight |
|---|---|
| Bis(thiocyanomethyl)sulfoxide | 80 |
| Alkylated naphthalene sodium sulfonate (wetting agent) | 1 |
| Low viscosity methyl cellulose | .3 |
| Fuller's earth | 6.7 |
| Synthetic fine silica | 12 |

This composition wets readily and forms a good dispersion when mixed with a large quantity of water. This dispersion was suitable as a foliar spray for application by conventional spray equipment for the protection of living plants from fungi attack.

When made into a slurry by the addition of a small amount of water, this composition was suitable for application with slurry type seed treaters for the protection of seed from fungus attack.

In place of the bis(thiocyanomethyl)sulfoxide of the above composition, bis(thiocyanomethyl)sulfone can be employed in an equal amount by weight to prepare a suitable wettable powder.

Example 5

A free flowing dust was prepared by mixing the ingredients of Example 4 in a ribbon blender and passing the mixture through a micropulverizer. One part of this mixture was then further blended with 7 parts of talc to prepare a dust containing 10% active ingredient.

This free flowing dust was readily applicable to areas to be protected from fungi attack by conventional dusting equipment.

Example 6

A wet paste fungicidal and bactericidal composition of the following composition was prepared by mixing the ingredients and milling the mixture in a pebble mill for 24 hours.

| Ingredigent: | Parts by weight |
|---|---|
| Bis(thiocyanomethyl)sulfone | 30 |
| Lignin sulfonic acid, sodium salt | 5 |
| Hydrated attapulgite | 3 |
| Water | 62 |

The product was a fluid suspension and showed no caking when allowed to stand. When diluted with water, it formed a highly dispersed suspension of very fine particles, which water dispersion was highly suitable for application as a foliar fungicidal spray using conventional spray equipment.

The following are examples of fungicidal compositions comprising an organic liquid diluent and an active ingredient:

Example 7

| Ingredigent: | Parts by weight |
|---|---|
| Bis(thiocyanomethyl)sulfone | 30 |
| Rhodamine dye | 1 |
| Ethylene glycol | 69 |

This fluid suspension composition when applied at a dosage of 4 oz. per bushel of seed controlled fungi on sorghum seed.

Example 8

| Ingredigent: | Parts by weight |
|---|---|
| Bis(thiocyanomethyl)sulfoxide | 3 |
| Acetone | 97 |

This composition is suitable for the control of fungi on lumber.

I claim:
1. A fungicidal composition comprising a compound selected from the group consisting of bis(thiocyanomethyl)sulfoxide and bis(thiocyanomethyl)sulfone, and a surface active agent in an amount sufficient to impart water-dispersibility thereto.

2. A fungicidal dust composition comprising a finely divided inert solid carrier and a compound selected from the group consisting of bis(thiocyanomethyl)sulfoxide and bis(thiocyanomethyl)sulfone.

3. A fungicidal composition comprising an organic liquid carrier and a compound selected from the group consisting of bis(thiocyanomethyl)sulfoxide and bis(thiocyanomethyl)sulfone.

4. A process for the control of fungi which comprises applying to the material to be protected a compound selected from the group consisting of bis(thiocyanomethyl)sulfoxide and bis(thiocyanomethyl)sulfone.

5. A process for the control of fungi in soil which comprises applying to the soil a compound selected from the group consisting of bis(thiocyanomethyl)sulfoxide and bis(thiocyanomethyl)sulfone.

References Cited in the file of this patent

UNITED STATES PATENTS

| | | |
|---|---|---|
| 2,077,479 | Hollander et al. | Apr. 20, 1937 |
| 2,110,943 | Remensnyder | Mar. 15, 1938 |
| 2,404,717 | Houtz | July 23, 1946 |

OTHER REFERENCES

Gilman: Organic Chemistry, volume I, second edition, 1953, pages 870, 871, 874.

UNITED STATES PATENT OFFICE

CERTIFICATE OF CORRECTION

Patent No. 2,855,339                                                        October 7, 1958

Hein L. Klopping

It is hereby certified that error appears in the printed specification of the above numbered patent requiring correction and that the said Letters Patent should read as corrected below.

Column 4, line 56, for "$C_4N_4N_2OS_3$" read -- $C_4H_4N_2OS_3$ --; line 71, for "33 lbs. acre" read -- 33 lbs./acre --; column 5, line 30, for "weighted" read -- weighed --; line 34, after "acetic" insert -- acid --; column 6, lines 1, 38, 55 and 64, for "Ingredigent", each occurrence, read -- Ingredient --.

Signed and sealed this 10th day of February 1959.

(SEAL)
Attest:

KARL H. AXLINE                                                     ROBERT C. WATSON

Attesting Officer                                           Commissioner of Patents